US012617391B2

(12) United States Patent
Kato et al.

(10) Patent No.: US 12,617,391 B2
(45) Date of Patent: May 5, 2026

(54) MOBILE OBJECT CONTROL DEVICE, MOBILE OBJECT CONTROL METHOD, AND STORAGE MEDIUM

(71) Applicant: HONDA MOTOR CO., LTD., Tokyo (JP)

(72) Inventors: Atsushi Kato, Wako (JP); Kotaro Fujimura, Wako (JP); Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 136 days.

(21) Appl. No.: 18/243,680

(22) Filed: Sep. 8, 2023

(65) Prior Publication Data

US 2024/0083417 A1 Mar. 14, 2024

(30) Foreign Application Priority Data

Sep. 12, 2022 (JP) ................................. 2022-144380

(51) Int. Cl.
*B60W 30/09* (2012.01)
*B60W 50/00* (2006.01)

(52) U.S. Cl.
CPC ........ *B60W 30/09* (2013.01); *B60W 50/0098* (2013.01); *B60W 2050/0022* (2013.01)

(58) Field of Classification Search
CPC ............ B60W 30/09; B60W 50/0098; B60W 2050/0022; B60W 2754/10;
(Continued)

(56) References Cited

U.S. PATENT DOCUMENTS

| | | | |
|---|---|---|---|
| 2008/0097699 A1* | 4/2008 | Ono ................... | B62D 15/0265 |
| | | | 701/300 |
| 2009/0037052 A1* | 2/2009 | Ogasawara ............ | G08G 1/167 |
| | | | 701/41 |

(Continued)

FOREIGN PATENT DOCUMENTS

| | | | |
|---|---|---|---|
| JP | 2007099237 A | * | 4/2007 |
| JP | 2010-018062 | | 1/2010 |

(Continued)

OTHER PUBLICATIONS

Japanese Office Action for Japanese Patent Application No. 2022-144380 mailed Jul. 8, 2025.

(Continued)

*Primary Examiner* — Daniel M. Robert
(74) *Attorney, Agent, or Firm* — Amin, Turocy & Watson, LLP

(57) ABSTRACT

Provided is a mobile object control device including: a storage medium having computer-readable instructions stored therein; and a processor connected to the storage medium, wherein the processor executes the computer-readable instructions to recognize an object which is located near a mobile object, set a risk which is an index value indicating a degree to which the mobile object should avoid entry on the basis of a position of the object, and generate a target trajectory for the mobile object to travel along so as to pass through a point at which the risk is low, and generating the target trajectory includes setting a plurality of first observation points at intervals in a traveling direction of the mobile object, setting one or more second observation points in each of a left direction and a right direction as seen from the mobile object for each of the plurality of first observation points, and searching for a point at which the risk is low on the basis of the risk at an observation point (Continued)

group including a first observation point and a second observation point corresponding to each other.

5 Claims, 9 Drawing Sheets

(58) Field of Classification Search
CPC ......... B60W 30/0956; B60W 60/0011; B60W 60/001; B60W 40/10; B60W 60/0016
See application file for complete search history.

(56) References Cited

U.S. PATENT DOCUMENTS

| | | | | |
|---|---|---|---|---|
| 2011/0187515 | A1* | 8/2011 | Saito | B60W 30/0956 |
| | | | | 701/1 |
| 2019/0377352 | A1* | 12/2019 | Weißwange | B60W 60/0027 |
| 2020/0164873 | A1* | 5/2020 | Nanri | B60W 50/0097 |
| 2020/0290649 | A1 | 9/2020 | Yamane et al. | |
| 2020/0353918 | A1* | 11/2020 | Goto | B60W 30/095 |
| 2020/0385017 | A1 | 12/2020 | Baba et al. | |
| 2021/0046928 | A1* | 2/2021 | Ohmura | B60W 50/12 |
| 2021/0291820 | A1* | 9/2021 | Inoue | B60W 10/04 |
| 2023/0192132 | A1* | 6/2023 | Oh | B60W 30/095 |
| | | | | 701/26 |
| 2023/0365131 | A1* | 11/2023 | Do | B60W 50/14 |
| 2024/0083417 | A1* | 3/2024 | Kato | B60W 30/09 |

FOREIGN PATENT DOCUMENTS

| | | | | | |
|---|---|---|---|---|---|
| JP | 2017182563 | A | * | 10/2017 | |
| JP | 2018192954 | A | * | 12/2018 | |
| JP | 2019028524 | A | * | 2/2019 | |
| JP | 2019-034627 | | | 3/2019 | |
| JP | 2019034627 | A | * | 3/2019 | B60W 30/08 |
| JP | 2020-149233 | | | 9/2020 | |
| JP | 2020-185946 | | | 11/2020 | |
| JP | 2021-147010 | | | 9/2021 | |

OTHER PUBLICATIONS

Japanese Office Action for Japanese Patent Application No. 2022-144380 mailed Nov. 11, 2025.

* cited by examiner

MOBILE OBJECT CONTROL DEVICE, MOBILE OBJECT CONTROL METHOD, AND STORAGE MEDIUM

CROSS-REFERENCE TO RELATED APPLICATION

Priority is claimed on Japanese Patent Application No. 2022-144380, filed Sep. 12, 2022, the content of which is incorporated herein by reference.

FIELD OF THE INVENTION

Background

The present invention relates to a mobile object control device, a mobile object control method, and a storage medium.

Description of Related Art

There has been progress in research and practical applications of automatedly driving a mobile object, for example, a vehicle (hereinafter, automated driving). In automated driving, it is required to automatedly generate a target trajectory in accordance with the situation in the direction of travel.

In connection with this, an invention of a vehicle control device is disclosed that includes a first setting unit that sets a first potential for a plurality of divided regions obtained by dividing a road region on the basis of the road region, a second setting unit that sets a second potential for the divided region on the basis of a nearby object detected by the detection unit, an evaluation unit that derives an index value obtained by evaluating potentials of a divided region to be focused on among the plurality of divided regions on the basis of the first potential and the second potential set in the focused divided region and foresight information generated for a nearby divided region selected from the periphery of the focused divided region, and a selection unit that selects one or more divided regions in the traveling direction of the vehicle from the plurality of divided regions on the basis of the index value derived by the evaluation unit (Japanese Unexamined Patent Application, First Publication No. 2019-34627).

The target trajectory is generated, for example, by setting an index value (potential in Patent Literature 1, hereinafter referred to as risk) indicating the degree to which a mobile object should not enter a road surface and passing through a point at which the risk is low.

Incidentally, since an exhaustive search for low-risk points increases the processing load, a search method using a sine wave is being examined FIG. 1 is a diagram illustrating an example of a search method. In this search method, a reference observation point pR (for example, set along the center of the road) is multiplied by a sine wave called a perturbation signal to set a movable observation point pM of which the position is shifted left and right, and a risk grade (a value indicating in which direction, left or right, the passing point should be shifted to reduce the risk) is obtained by obtaining a moving average of risks at a plurality of movable observation points pM.

SUMMARY

In the above search method, a flow of processing is assumed in which a risk on one movable observation point pM is extracted for each control cycle and calculation is repeatedly performed for each control cycle. However, in the current situation where the processing load on a control computer that controls automated driving is excessive, it is difficult to speed up the control cycle sufficiently, and thus it has sometimes been difficult to generate a target trajectory in time for the movement of a mobile object. The present invention was contrived in view of such circumstances, and one object thereof is to provide a mobile object control device, a mobile object control method, and a storage medium which make it possible to more rapidly generate a target trajectory based on a risk.

The following configurations are adopted in a mobile object control device, a mobile object control method, and a storage medium according to this invention.

(1) According to an aspect of this invention, there is provided a mobile object control device including: a storage medium having computer-readable instructions stored therein; and a processor connected to the storage medium, wherein the processor executes the computer-readable instructions to recognize an object which is located near a mobile object, set a risk which is an index value indicating a degree to which the mobile object should avoid entry on the basis of a position of the object, and generate a target trajectory for the mobile object to travel along so as to pass through a point at which the risk is low, and generating the target trajectory includes setting a plurality of first observation points at intervals in a traveling direction of the mobile object, setting one or more second observation points in each of a left direction and a right direction as seen from the mobile object for each of the plurality of first observation points, and searching for a point at which the risk is low on the basis of the risk at an observation point group including a first observation point and a second observation point corresponding to each other.

(2) In the aspect of the above (1), the processor calculates a difference in the risk between observation points adjacent to each other in the left and right directions as seen from the mobile object among first observation points and second observation points included in the observation point group, calculates a risk grade on the basis of the difference in the risk, and corrects a passing point of the target trajectory in a direction in which the risk decreases on the basis of the risk grade.

(3) In the aspect of the above (2), the processor calculates the risk grade by calculating a weighted sum of the difference in the risk.

(4) In the aspect of the above (3), the processor calculates the risk grade by calculating a weighted sum in which symmetrical weights are applied to the difference in the risk.

(5) In the aspect of the above (2), the processor generates the target trajectory by first setting a base path, setting the plurality of first observation points on the base path at intervals, and correcting the base path in a direction in which the risk decreases on the basis of the risk grade, in one control cycle.

(6) According to another aspect of the present invention, there is provided a mobile object control method executed using a mobile object control device, the method including: recognizing an object which is located near a mobile object; setting a risk which is an index value indicating a degree to which the mobile object should avoid entry on the basis of a position of the object; and generating a target trajectory for the mobile object to travel along so as to pass through a point at which the risk is low, wherein generating the target trajectory includes setting a plurality of first observation points at intervals in a traveling direction of the mobile object, setting one or more second observation points in each of a left direction and a right direction as seen from the mobile object for each of the plurality of first observation points, and searching for a point at which the risk is low on the basis of the risk at an observation point group including a first observation point and a second observation point corresponding to each other.

(7) According to another aspect of the present invention, there is provided a computer-readable non-transitory storage medium having a program stored therein, the program causing a processor of a mobile object control device to execute: recognizing an object which is located near a mobile object; setting a risk which is an index value indicating a degree to which the mobile object should avoid entry on the basis of a position of the object; and generating a target trajectory for the mobile object to travel along so as to pass through a point at which the risk is low, wherein generating the target trajectory includes setting a plurality of first observation points at intervals in a traveling direction of the mobile object, setting one or more second observation points in each of a left direction and a right direction as seen from the mobile object for each of the plurality of first observation points, and searching for a point at which the risk is low on the basis of the risk at an observation point group including a first observation point and a second observation point corresponding to each other.

According to the aspects of the above (1) to (7), it is possible to more rapidly generate a target trajectory based on a risk.

DESCRIPTION OF EMBODIMENTS

Hereinafter, an embodiment of a mobile object control device, a mobile object control method, and a storage medium of the present invention will be described with reference to the accompanying drawings. In the following description, although a vehicle is a representative example of mobile objects, mobile objects are not limited to vehicles, and the description can be applied to any mobile object that moves autonomously such as micro mobility and robots (including those with wheels, those that walk on multiple legs, and the like). In addition, in the following description, an example of a mobile object control device is referred to as an automated driving control device.

[Overall Configuration]

Figure 2:
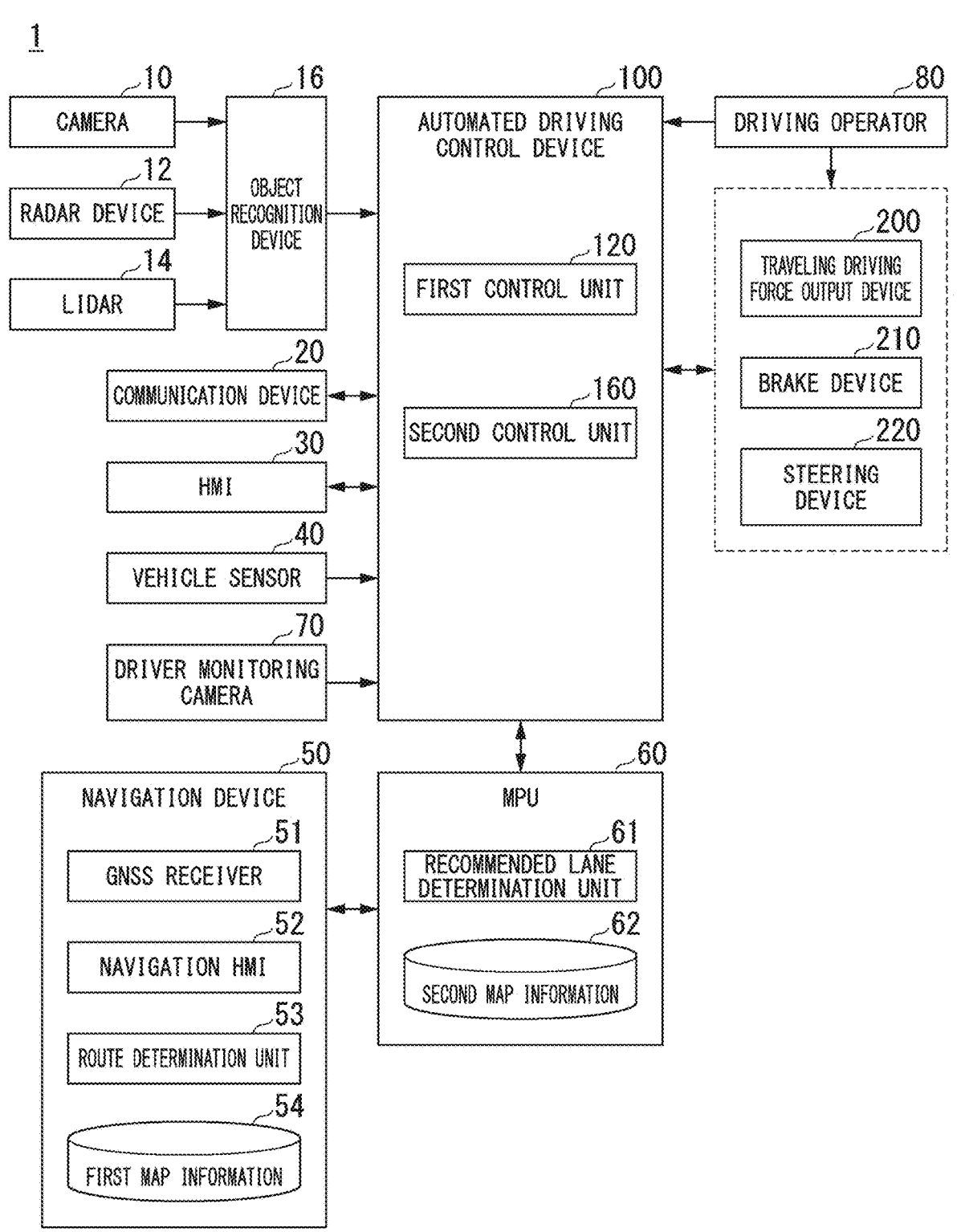
FIG. 2 is a configuration diagram of a vehicle system using a mobile object control device according to an embodiment.

FIG. 2 is a configuration diagram of a vehicle system 1 using a mobile object control device according to an embodiment. A vehicle having the vehicle system 1 mounted therein is, for example, a two-wheeled, three-wheeled, or four-wheeled vehicle or the like, and the driving source thereof is an internal-combustion engine such as a diesel engine or a gasoline engine, an electric motor, or a combination thereof. The electric motor operates using power generated by a generator connected to an internal-combustion engine or discharging power of a secondary battery or a fuel cell.

Figure 1:
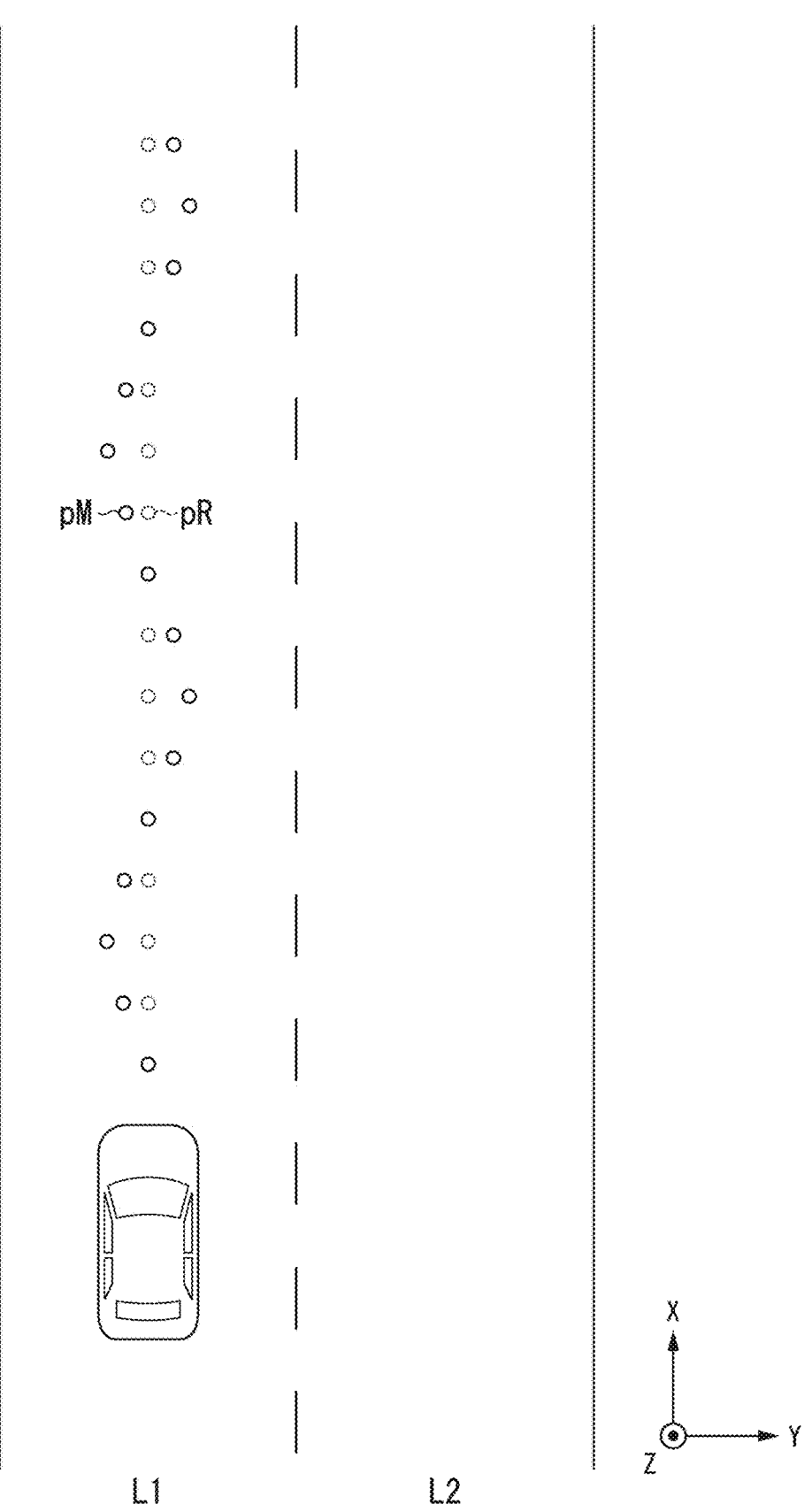
FIG. 1 is a diagram illustrating an example of a search method.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driver monitoring camera 70, a driving operator 80, an automated driving control device 100, a traveling driving force output device 200, a brake device 210, and a steering device 220. These devices or instruments are connected to each other through a multiplex communication line such as a controller area network (CAN) communication line, a serial communication line, a wireless communication network, or the like. Meanwhile, the configuration shown in FIG. 1 is merely an example, and some portions of the configuration may be omitted, or other configurations may be further added.

The camera 10 is a digital camera using a solid-state imaging element such as, for example, a charge coupled device (CCD) or a complementary metal oxide semiconductor (CMOS). The camera 10 is installed at any point on a vehicle having the vehicle system 1 mounted therein (hereinafter referred to as a host vehicle M). In a case where a forward image is captured, the camera 10 is installed on the upper portion of the front windshield, the rear surface of the rear-view mirror, or the like. The camera 10, for example, repeatedly captures an image of the vicinity of the host vehicle M periodically. The camera 10 may be a stereo camera.

The radar device 12 radiates radio waves such as millimeter waves to the vicinity of the host vehicle M, and detects radio waves (reflected waves) reflected from an object to detect at least the position (distance to and orientation of) of the object. The radar device 12 is installed at any point of the host vehicle M. The radar device 12 may detect the position and speed of an object with a frequency modulated continuous wave (FM-CW) system.

The LIDAR 14 irradiates the vicinity of the host vehicle M with light (or electromagnetic waves having a wavelength close to that of light), and measures scattered light. The LIDAR 14 detects a distance to an object on the basis of a time from light emission to light reception. The irradiation light is, for example, pulsed laser light. The LIDAR 14 is installed at any point on the host vehicle M.

The object recognition device 16 recognizes the position, type, speed, or the like of an object by performing a sensor fusion process on the results of detection performed by some or all of the camera 10, the radar device 12, and the LIDAR 14. The object recognition device 16 outputs the recognition results to the automated driving control device 100. The object recognition device 16 may output the detection results of the camera 10, the radar device 12, and the LIDAR 14 as they are to the automated driving control device 100. The object recognition device 16 may be omitted from the vehicle system 1.

The communication device 20 communicates with another vehicle which is present in the vicinity of the host vehicle M using, for example, a cellular network, a Wi-Fi network, Bluetooth (registered trademark), dedicated short range communication (DSRC), or the like, or communicates with server devices of various types through a wireless base station.

The HMI 30 presents various types of information to an occupant of the host vehicle M, and accepts the occupant's input operation. The HMI 30 includes various display devices, a speaker, a buzzer, a touch panel, a switch, a key, and the like.

The vehicle sensor 40 includes a vehicle speed sensor that detects the speed of the host vehicle M, an acceleration sensor that detects an acceleration, a yaw rate sensor that detects an angular velocity around a vertical axis, an orientation sensor that detects the direction of the host vehicle M, or the like.

The navigation device 50 includes, for example, a global navigation satellite system (GNSS) receiver 51, a navigation HMI 52, and a route determination unit 53. The navigation device 50 holds first map information 54 in a storage device such as a hard disk drive (HDD) or a flash memory. The GNSS receiver 51 identifies the position of the host vehicle M on the basis of a signal received from a GNSS satellite. The position of the host vehicle M may be specified or complemented by an inertial navigation system (INS) in which an output of the vehicle sensor 40 is used. The navigation HMI 52 includes a display device, a speaker, a touch panel, a key, and the like. A portion or the entirety of the navigation HMI 52 may be shared with the above-described HMI 30. The route determination unit 53 determines, for example, a route (hereinafter, a route on a map) from the position (or any input position) of the host vehicle M specified by the GNSS receiver 51 to a destination input by an occupant using the navigation HMI 52 with reference to the first map information 54. The first map information 54 is, for example, information in which a road shape is represented by a link indicating a road and nodes connected by the link. The first map information 54 may include the curvature of a road, point of interest (POI) information, or the like. The route on a map is output to the MPU 60. The navigation device 50 may perform route guidance using the navigation HMI 52 on the basis of the route on a map. The navigation device 50 may be realized by the function of a terminal device such as, for example, a smartphone or a tablet terminal possessed by an occupant. The navigation device 50 may transmit its current position and destination to a navigation server through the communication device 20, and acquire the same route as the route on a map from the navigation server.

The MPU 60 includes, for example, a recommended lane determination unit 61, and holds second map information 62 in a storage device such as an HDD or a flash memory. The recommended lane determination unit 61 divides the route on a map provided from the navigation device 50 into a plurality of blocks (for example, divides the route on a map every 100 [m] in a vehicle traveling direction), and determines a recommended lane for each block with reference to the second map information 62. The recommended lane determination unit 61 makes a determination on which lane from the left to travel along. In a case where a branch point is present on the route on a map, the recommended lane determination unit 61 determines a recommended lane so that the host vehicle M can travel along a logical route for advancing to a branch destination.

The second map information 62 is map information having a higher accuracy than the first map information 54. The second map information 62 includes, for example, information of the center of a lane, information of the boundary of a lane, or the like. In addition, the second map information 62 may include road information, traffic regulation information, address information (an address or a postal code), facility information, telephone number information, and the like. The second map information 62 may be updated when necessary by the communication device 20 communicating with another device.

The driver monitoring camera 70 is a digital camera using a solid-state imaging element such as, for example, a CCD or a CMOS. The driver monitoring camera 70 is installed at any point in the host vehicle M at a position and in a direction in which the head of an occupant who sits on a driver's seat of the host vehicle M (hereinafter referred to as a driver) can be imaged from the front (in a direction in which his/her face is imaged). For example, the driver monitoring camera 70 is installed on the upper portion of a display device provided in the central portion of the instrument panel of the host vehicle M.

The driving operator 80 includes, for example, a steering wheel, an accelerator pedal, a brake pedal, a shift lever, and other operators. A sensor that detects the amount of operation or the presence or absence of operation is installed on the driving operator 80, and the detection results are output to the automated driving control device 100, or some or all of the traveling driving force output device 200, the brake device 210, and the steering device 220.

The automated driving control device 100 includes, for example, a first control unit 120 and a second control unit 160. The first control unit 120, the second control unit 160, and their internal configurations are realized by a hardware processor such as, for example, a central processing unit (CPU) executing a program (software). In addition, some or all of these components may be realized by hardware (a circuit unit; including circuitry) such as a large scale integration (LSI), an application specific integrated circuit (ASIC), a field-programmable gate array (FPGA), or a graphics processing unit (GPU), and may be realized by software and hardware in cooperation. The program may be stored in an HDD of the automated driving control device 100 or a storage device such as a flash memory (a storage device including a non-transitory storage medium) in advance, may be stored in a detachable storage medium such as a DVD or a CD-ROM, or may be installed in the HDD of the automated driving control device 100 or the flash memory by the storage medium (non-transitory storage medium) being mounted in a drive device.

Figure 3:
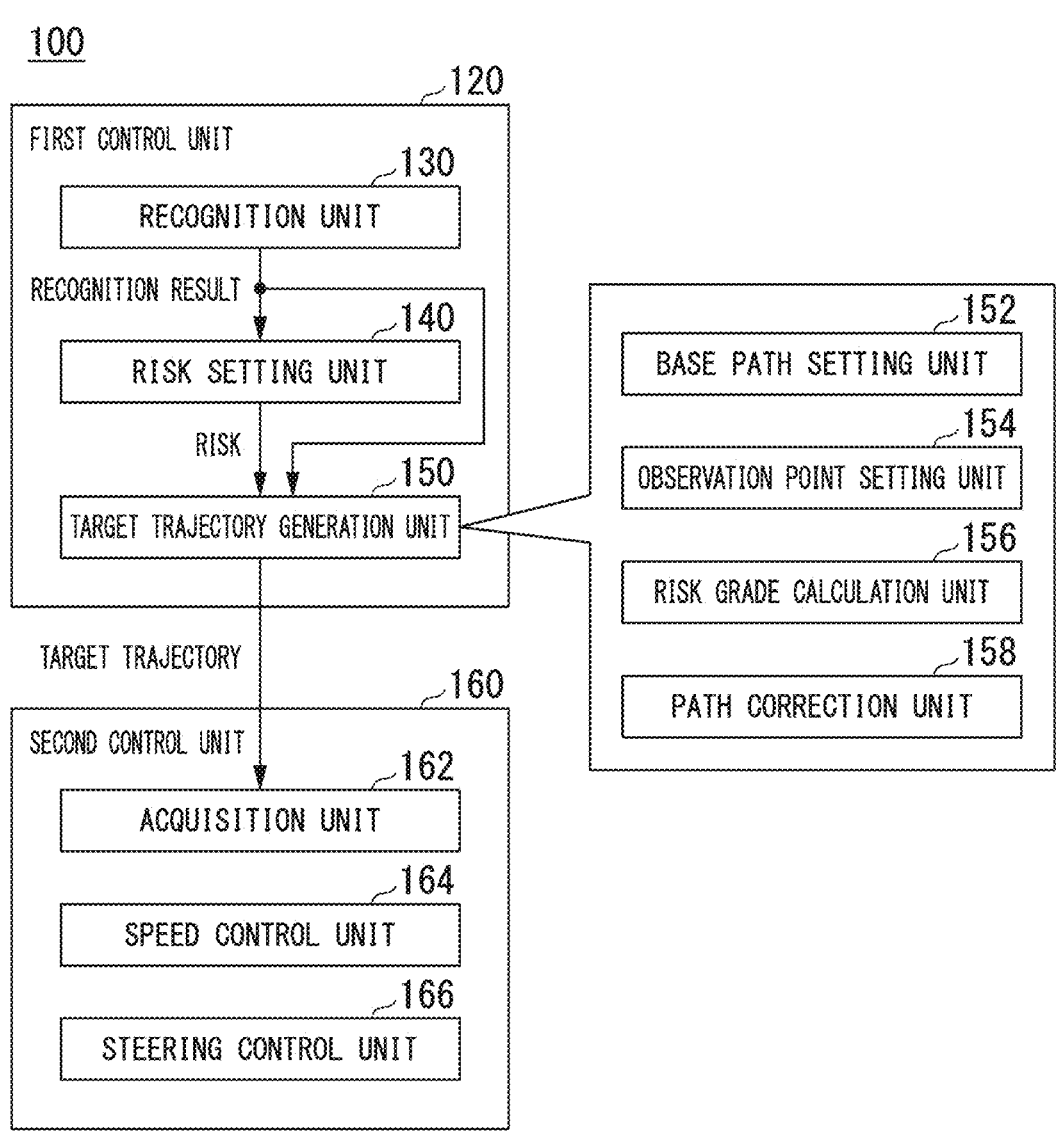
FIG. 3 is a functional configuration diagram of a first control unit and a second control unit.

FIG. 3 is a functional configuration diagram of the first control unit 120 and the second control unit 160. The first control unit 120 includes, for example, a recognition unit 130, a risk setting unit 140, and a target trajectory generation unit 150. The first control unit 120 concurrently realizes, for example, a function based on artificial intelligence (AI) and a function based on a model imparted in advance. For example, a function of "recognizing a point of intersection" may be realized by the recognition of a point of intersection based on deep learning or the like and recognition based on conditions (such as a signal or a road sign on which pattern matching is possible) imparted in advance being concurrently executed, and being comprehensively evaluated by performing scoring on both. Thereby, the reliability of automated driving is secured.

The recognition unit 130 recognizes the state of the position, speed, acceleration, or the like of an object which is located in the vicinity of the host vehicle M on the basis of information which is input from the camera 10, the radar device 12, and the LIDAR 14 through the object recognition device 16. The position of the object is recognized as, for example, a position in absolute coordinates with a representative point (such as the centroid or the center of a drive shaft) of the host vehicle M as an origin, and is used in control. The position of the object may be represented by a representative point such as the centroid or a corner of the object, or may be represented by a region. The "state" of the object may include the acceleration or jerk of the object, or a "behavior state" (for example, whether it is performing or attempting to perform a lane change). The object includes traffic participants such as other vehicles, pedestrians, or bicycles, road boundaries that partition traveling lanes to be described later, and the like.

In addition, the recognition unit 130 recognizes, for example, a lane (traveling lane) along which the host vehicle M travels. For example, the recognition unit 130 recognizes a road partition line and a traveling lane by comparing a pattern of a road partition line (for example, an array of solid lines and broken lines) obtained from the second map information 62 with a pattern of a road partition line located in the vicinity of the host vehicle M which is recognized from an image captured by the camera 10. Meanwhile, the recognition unit 130 may recognize a traveling lane by recognizing a lane boundary (road boundary) including a shoulder, a curbstone, a median strip, a guardrail, or the like without being limited to the recognition of a road partition line. In this recognition, the position of the host vehicle M acquired from the navigation device 50 or processing results based on an INS may be added. In addition, the recognition unit 130 recognizes a stop line, an obstacle, a red light, a tollbooth, and other road events.

Upon recognizing a traveling lane, the recognition unit 130 recognizes the position or posture of the host vehicle M with respect to the traveling lane. The recognition unit 130 may recognize, for example, deviation of the host vehicle M from the center of the lane which is a reference point, and an angle formed with respect to a line aligned with the center of the lane of the host vehicle M in its traveling direction, as the relative position and posture of the host vehicle M with respect to the traveling lane. Instead, the recognition unit 130 may recognize the position of the reference point of the host vehicle M or the like with respect to either lateral end portion (a road partition line or a road boundary) of the traveling lane, as the relative position of the host vehicle M with respect to the traveling lane.

Figure 4:
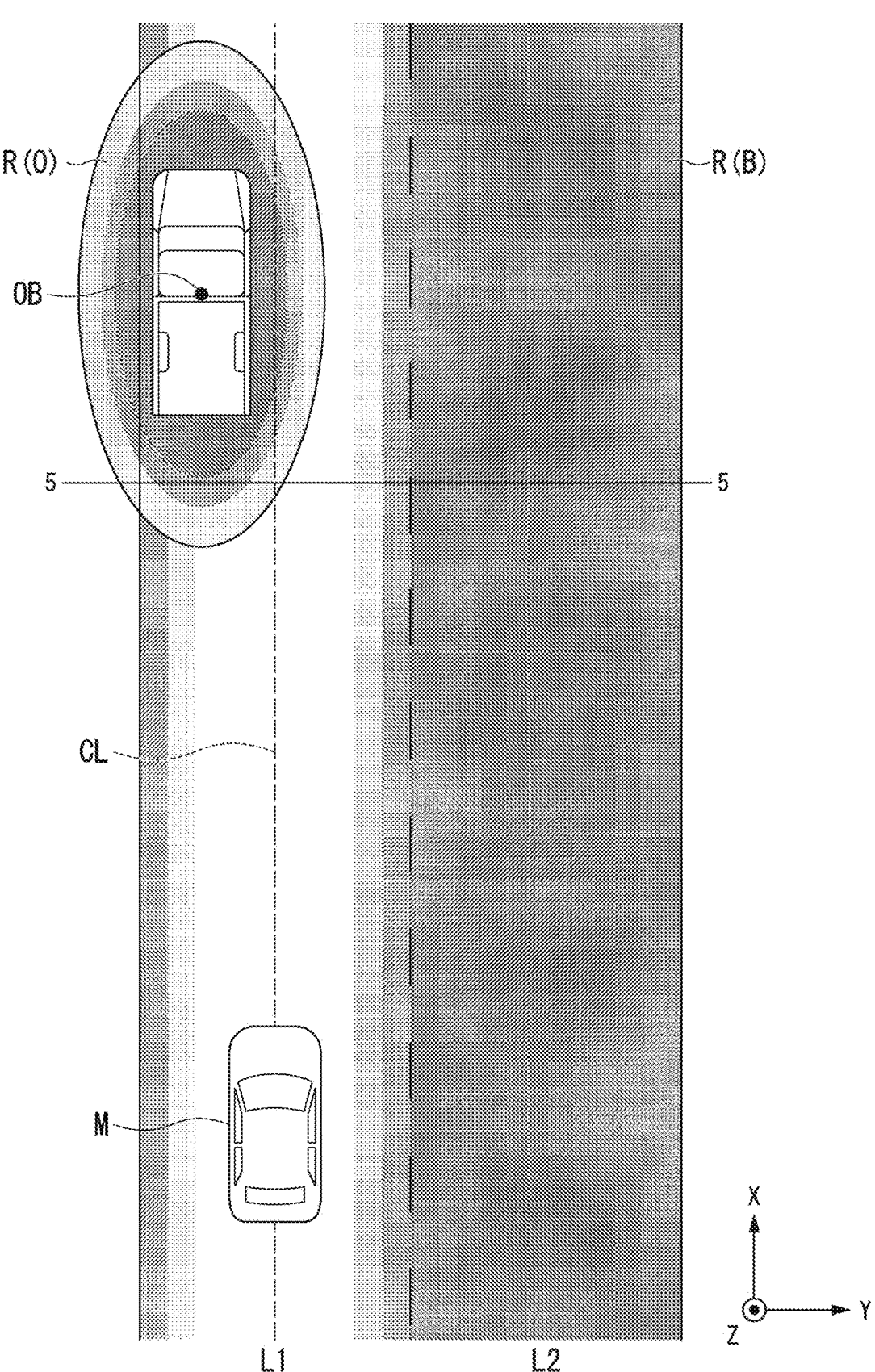
FIG. 4 is a diagram illustrating a risk which is set by a risk setting unit.

The risk setting unit 140 sets a risk R( ), which is an index value that becomes more negative as it gets closer to the object recognized by the recognition unit 130, on the road plane in the traveling direction of the host vehicle M. The risk R( ) is an index value indicating the degree to which the host vehicle M should avoid entry. The road plane is a plane viewed virtually from above, and is similar to a map. FIG. 4 is a diagram illustrating a risk which is set by the risk setting unit 140. In the drawing, R(O) is a risk corresponding to an obstacle (for example, a parked vehicle) OB. The risk R(O) increases closer to the obstacle OB (for example, increases closer to the center of the obstacle OB), decreases with increasing distance from the obstacle OB, and reaches zero. In the drawing, R(B) is a risk corresponding to the road boundary. The risk R(B), for example, decreases as it gets closer to the central line CL of the lane L1 in which the host vehicle M is located, increases as it approaches the left road boundary, and increases as it approaches the right road boundary. However, since the lane can be changed to the lane L2 in the illustrated scene, the value of the risk R(B) at the right road boundary may be set to be smaller than the value of the risk R(B) at the left road boundary.

Figure 5:
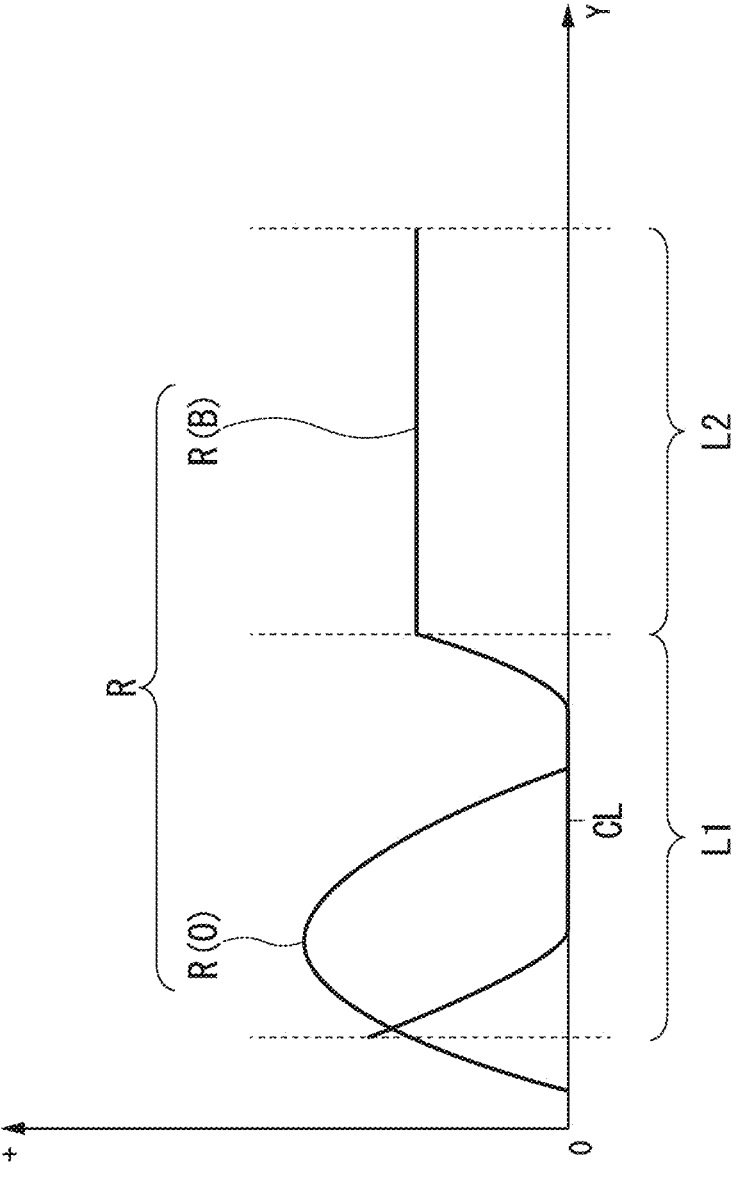
FIG. 5 shows the value of risk on line 5-5 in FIG. 4.

FIG. 5 shows the value of risk on line 5-5 in FIG. 4. The risk setting unit 140 calculates the risks R(O) and R(B) in this way and adds the risk R(O) and the risk R(B) for each point to obtain a combined risk. Hereinafter, this combined risk is simply referred to as a risk R.

Meanwhile, a risk map showing the distribution of the risk R is created in time series corresponding to each future point in time such as, for example, 0.1 seconds later, 0.2 seconds later, and so on. The obstacle OB includes traffic participants such as vehicles, bicycles, or pedestrians, and the positions of traffic participants change depending on the point in time. Thus, future positions are predicted by the risk setting unit 140 using a known technique, and a risk corresponding to each future point in time is calculated. In a case where the value of the risk R is referenced later, the risk map is selected according to how many seconds later the risk R corresponding to the trajectory point is to be acquired. Since this is not the core part of the present invention, and thus detailed description will be omitted.

The target trajectory generation unit 150 automatedly generates a target trajectory along which the host vehicle M will travel in the future (irrespective of a driver's operation) so as to pass through a point where the risk R is small. The target trajectory includes, for example, a speed element. For example, the target trajectory may be represented as a trajectory obtained by arranging points (trajectory points) at which the host vehicle M will arrive in order. The trajectory points are points at which the host vehicle M will arrive after predetermined traveling distances (for example, approximately every several [m]) which are distances along a road. Separately from the trajectory points, a target speed and a target acceleration for each predetermined sampling time (for example, several tenths of a [sec]) are generated as a portion of the target trajectory. In addition, the trajectory points may be positions at which the host vehicle M will arrive at sampling times for respective predetermined sampling times. In this case, information of a target speed or target acceleration is represented by an interval between trajectory points.

Figure 6:
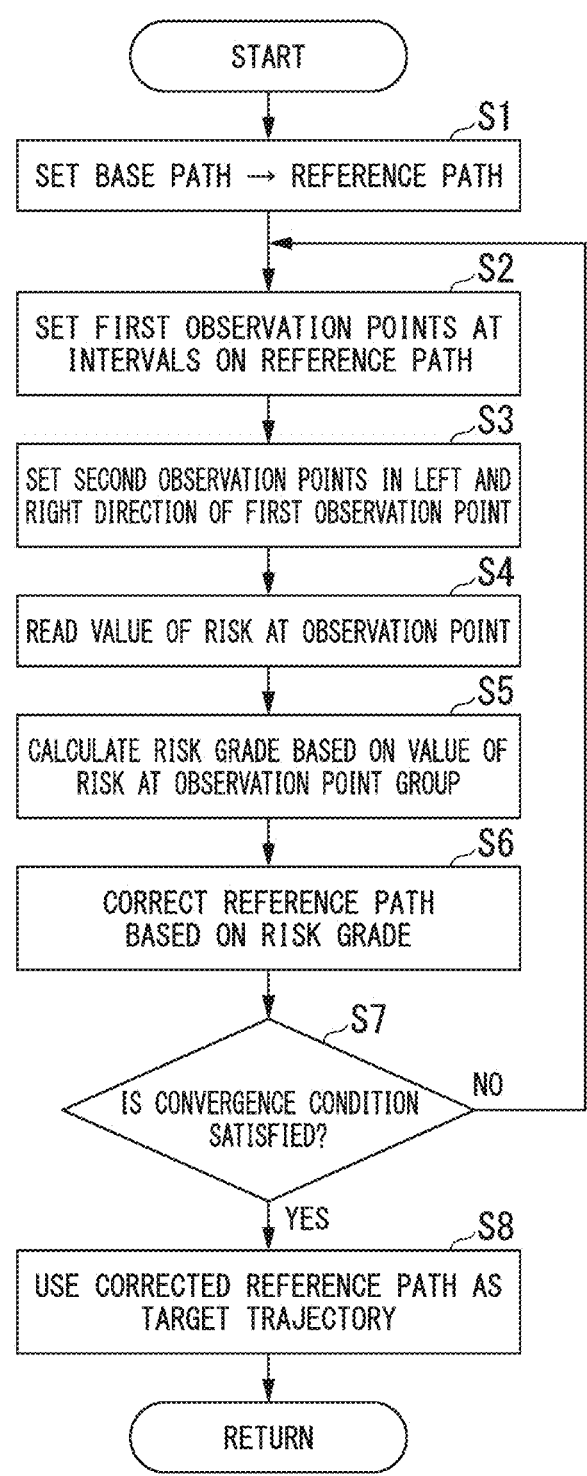
FIG. 6 is a diagram illustrating an example of a flow of processing performed by a target trajectory generation unit.

The target trajectory generation unit 150 includes, for example, a base path setting unit 152, an observation point setting unit 154, a risk grade calculation unit 156, and a path correction unit 158. FIG. 6 is a diagram illustrating an example of a flow of processing performed by the target trajectory generation unit 150. The target trajectory generation unit 150 repeatedly executes the processing shown in the drawing. A process of calculating a risk is executed by the risk setting unit 140 synchronously or asynchronously in parallel with the processing shown in FIG. 5, and the latest value of risk is stored in a memory and updated sequentially.

Figure 7:
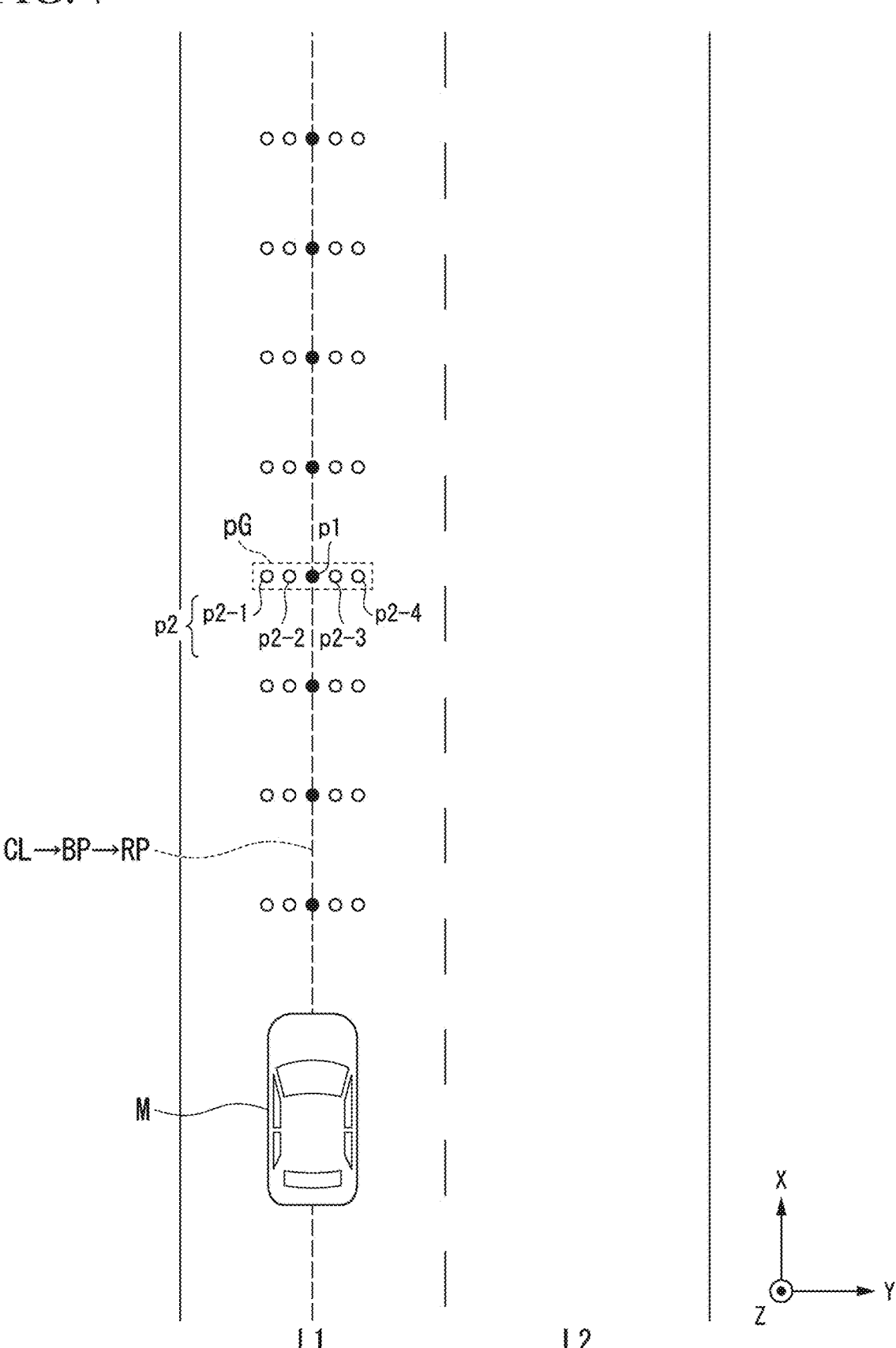
FIG. 7 is a diagram illustrating processes of steps S1 to S3.

First, the base path setting unit 152 sets a base path (step S1). FIG. 7 is a diagram illustrating processes of steps S1 to S3. The base path setting unit 152 sets, for example, the central line CL of the road (for example, lane) in which the host vehicle M is located and which extends in the traveling direction of the host vehicle, as a base path BP. Instead, the base path setting unit 152 may set the target trajectory previously determined in the processing according to this flowchart as the base path BP. Meanwhile, the target trajectory is a collection of trajectory points, but the description thereof is omitted here, and the target trajectory is assumed to be a line appropriately connecting the trajectory points.

The set base path BP is treated as an initial reference path RP in the subsequent processing. The reference path RP is a tentative target trajectory.

Next, the observation point setting unit 154 sets first observation points p1 at intervals on the reference path RP of the host vehicle M (step S2), and sets one or more second observation points p2 in the left direction and right direction of each of the first observation points p1 as seen from the host vehicle (step S3). In the shown example, two second observation points p2 are set on each of the left and right sides. In the drawing, a black circle represents the first observation point p1, and a white circle represents the second observation point p2. The second observation point p2 is defined as p2-1, p2-2, p2-3, and p2-4 in order from the left. Hereinafter, a set of the first observation point p1 and the second observation point p2 which are substantially the same distance from the host vehicle M and correspond to each other is referred to as an observation point group pG. The first observation points p1 are, for example, set at regular intervals as seen from the host vehicle M, but may be set so that the intervals are variable according to the distance from the host vehicle M. In addition, in a case where the reference path RP is curved, the second observation point p2 may be set in a direction (Y direction) orthogonal to the traveling direction (X direction) of the host vehicle M with respect to the first observation point p1, or may be set in the normal direction of the first observation point p1 on the reference path RP.

Next, the risk grade calculation unit 156 reads the value of risk at each observation point (each of the first observation point p1 and the second observation point p2) (step S4). The risk grade calculation unit 156 calculates a risk grade ΔR at the observation point group pG on the basis of the value of risk at the observation point group pG (step S5).

Figure 8:
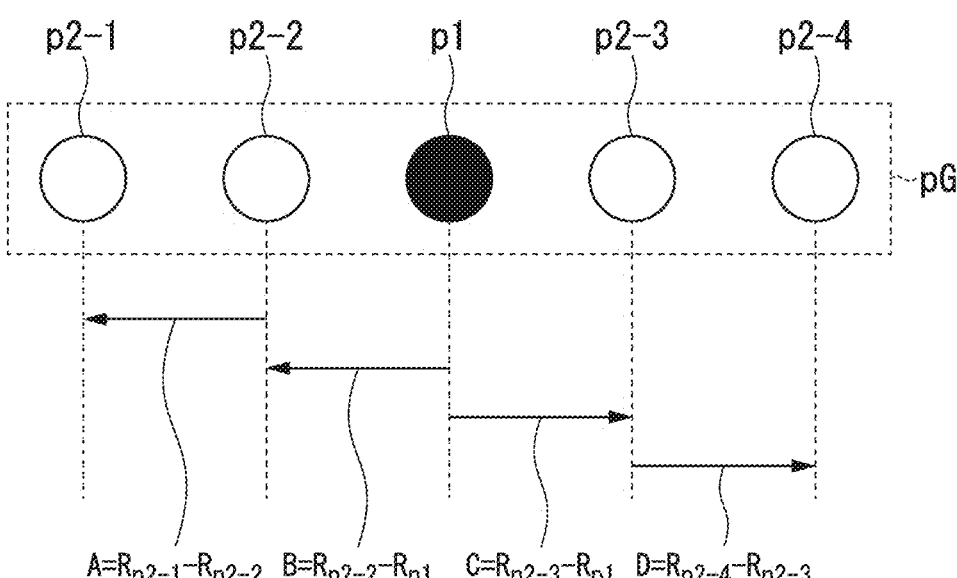
FIG. 8 is a diagram illustrating a process of calculating a risk grade.

FIG. 8 is a diagram illustrating a process of calculating a risk grade ΔR. The risk grade calculation unit 156 calculates, for example, the differences (A, B, C, and D in order) in the risk R between observation points adjacent to each other in the left and right directions as seen from the host vehicle M among the first observation points p1 and the second observation points p2 included in the observation point group pG (in the shown example, the second observation point p2-1 and the second observation point p2-2, the second observation point p2-2 and the first observation point p1, the first observation point p1 and the second observation point p2-3, and the second observation point p2-3 and the second observation point p2-4), and calculates the risk grade ΔR on the basis of the difference in the risk R. The risk grade calculation unit 156 calculates the risk grade ΔR, for example, by calculating a weighted sum in which symmetrical weights are applied to the differences in risk. The grade ΔR is calculated, for example, by Expression (1). The real numbers in Expression (1) are merely examples, and can be changed arbitrarily without departing from the gist of the present invention. The differences A, B, C, and D in the risk R are expressed by Expressions (2) to (5), respectively. $R_{p2-1}$ is the value of risk at the second observation point p2-1, $R_{p2-2}$ is the value of risk at the second observation point p2-2, $R_{p2-3}$ is the value of risk at the second observation point p2-3, $R_{p2-4}$ is the value of risk at the second observation point p2-4, and $R_{p1}$ is the value of risk at the first observation point p1.

$$\Delta R = (-0.3) \times A + (-0.7) \times B + 0.7 \times C + 0.3 \times D \tag{1}$$

$$A = R_{p2-1} - R_{p2-2} \tag{2}$$

$$B = R_{p2-2} - R_{p1} \tag{3}$$

$$C = R_{p2-3} - R_{p1} \tag{4}$$

$$D = R_{p2-4} - R_{p2-3} \tag{5}$$

Figure 9:
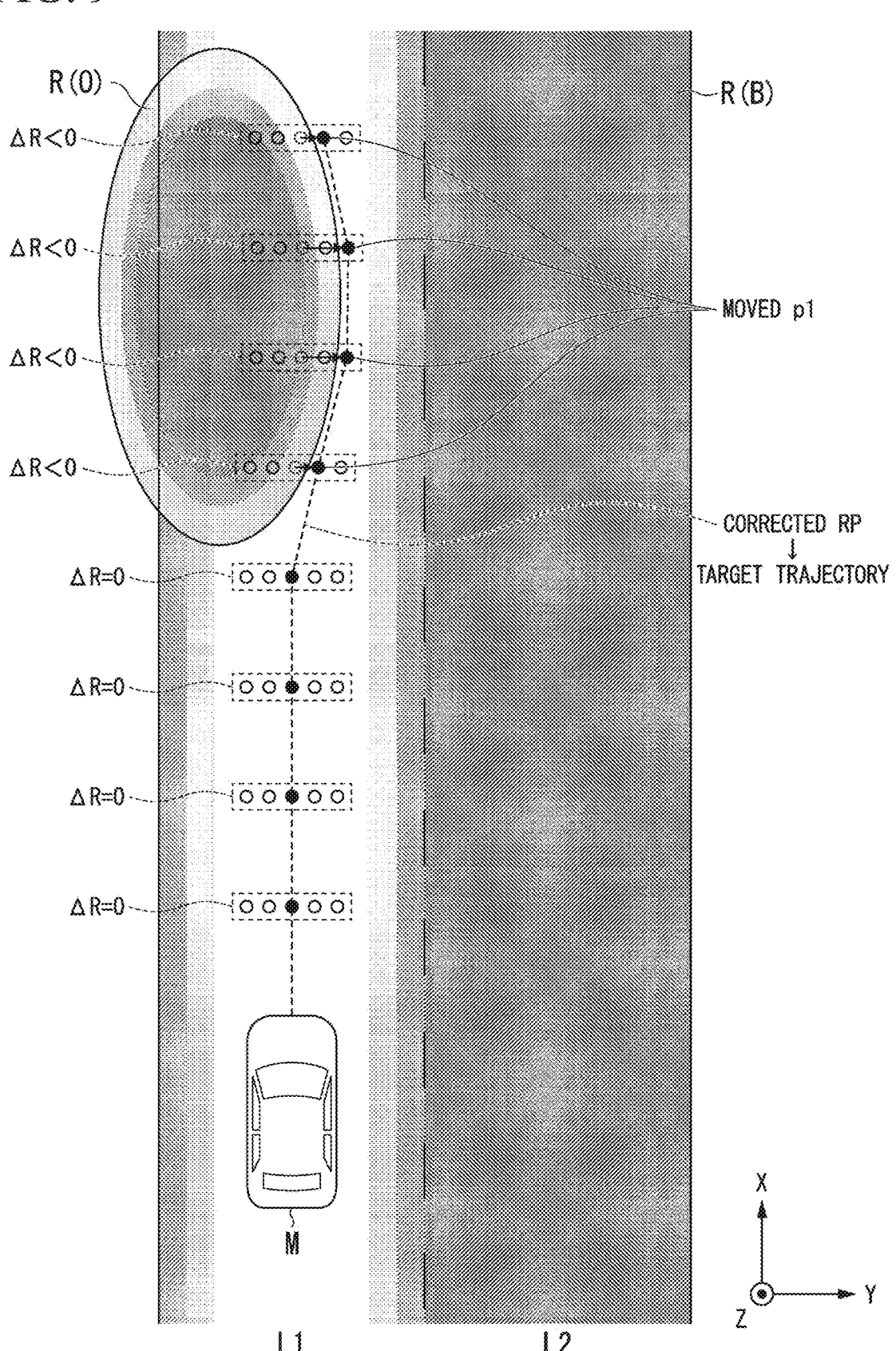
FIG. 9 is a diagram illustrating processing of a path correction unit.

The path correction unit 158 corrects the reference path RP on the basis of the risk grade ΔR (step S6). FIG. 9 is a diagram illustrating processing of the path correction unit 158. In a case where the risk grade ΔR is a negative value, the path correction unit 158 moves the first observation point p1 included in the observation point group corresponding to the risk grade ΔR in a direction in which the risk decreases, that is, to the right, and in a case where the risk grade ΔR is a positive value, the path correction unit moves the first observation point p1 included in the observation point group corresponding to the risk grade ΔR in a direction in which the risk decreases, that is, to the left. The path correction unit 158 may, for example, increase the amount of movement of the first observation point p1 as the absolute value of the risk grade ΔR becomes larger within a range in which the amount of movement does not exceed a predetermined upper limit. In addition, the path correction unit 158 does not move the first observation point p1 in a case where the absolute value of the risk grade ΔR is less than a threshold near zero. Thereby, the passing point of the target trajectory (final first observation point p1) is finally corrected. A line connecting the first observation points p1 that have been moved in this way or that have been maintained at they are without being moved is a corrected reference path.

Next, the target trajectory generation unit 150 determines whether the convergence condition is satisfied (step S7). The convergence condition is, for example, a condition that the ratio of the first observation points p1 which are maintained without being moved in step S6 is equal to or greater than a reference value (for example, about 80 to 90%). In a case where the convergence condition is not satisfied, the process returns to step S2. In this case, the reference path RP corrected in step S6 is to be processed in step S2. In a case where the convergence condition is satisfied, the target trajectory generation unit 150 outputs the reference path corrected in step S6 as the target trajectory to the second control unit 160 (step S8).

The second control unit 160 controls the traveling driving force output device 200, the brake device 210, and the steering device 220 so that the host vehicle M passes along the target trajectory generated by the target trajectory generation unit 150 according to scheduled times. That is, the second control unit 160 moves the host vehicle M along the target trajectory.

Referring back to FIG. 2, the second control unit 160 includes, for example, an acquisition unit 162, a speed control unit 164, and a steering control unit 166. The acquisition unit 162 acquires information of the target trajectory (trajectory point) generated by the target trajectory generation unit 150, and stores the acquired information in a memory (not shown). The speed control unit 164 controls the traveling driving force output device 200 or the brake device 210 on the basis of a speed element associated with the target trajectory stored in the memory. The steering control unit 166 controls the steering device 220 in accordance with the bent state of the target trajectory stored in the memory. The processes of the speed control unit 164 and the steering control unit 166 are realized by, for example, a combination of feedforward control and feedback control. As an example, the steering control unit 166 executes a combination of feedforward control according to the curvature of a road in front of the host vehicle M and feedback control based on deviation from the target trajectory.

The traveling driving force output device 200 outputs a traveling driving force (torque) for a vehicle to travel to a driving wheel. The traveling driving force output device 200 includes, for example, a combination of an internal-combustion engine, an electric motor, a transmission or the like, and an electronic control unit (ECU) that controls these components. The ECU controls the above components in accordance with information which is input from the second control unit 160 or information which is input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which is input from the second control unit 160 or the information which is input from the driving operator 80, and causes a brake torque according to a braking operation to be output to each wheel. The brake device 210 may include a mechanism that transfers hydraulic pressure generated by the operation of a brake pedal included in the driving operator 80 through a master cylinder to the cylinder as a backup. Meanwhile, the brake device 210 is not limited to the above-described configuration, and may be an electronic control type hydraulic brake device that controls an actuator in accordance with the information which is input from the second control unit 160 and transfers hydraulic pressure of the master cylinder to the cylinder.

The steering device 220 includes, for example, a steering ECU and an electric motor. The electric motor changes the direction of a turning wheel, for example, by causing a force to act on a rack and pinion mechanism. The steering ECU drives the electric motor in accordance with the information which is input from the second control unit 160 or the information which is input from the driving operator 80, and changes the direction of the turning wheel.

According to the embodiment described above, the recognition unit 130 that recognizes an object which is located near a mobile object (host vehicle M), the risk setting unit 140 that sets a risk which is an index value indicating the degree to which the mobile object should avoid entry on the basis of the position of the object, and the target trajectory generation unit 150 that generates a target trajectory for the mobile object to travel along so as to pass through a point at which the risk is low are included, and the target trajectory generation unit 150 sets a plurality of first observation points p1 at intervals in the traveling direction of the mobile object, sets one or more second observation points p2 in each of a left direction and a right direction as seen from the mobile object for each of the plurality of first observation points p1, and searches for a point at which the risk is low on the basis of the risk at the observation point group pG including the first observation point p1 and the second observation point p2 corresponding to each other, whereby it is possible to more rapidly generate a target trajectory based on the risk.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A mobile object control device comprising:
a storage medium having computer-readable instructions stored therein; and
a processor connected to the storage medium,
wherein the processor executes the computer-readable instructions to:
recognize an object which is located near a mobile object;
set a risk which is an index value indicating a degree to which the mobile object should avoid entry on the basis of a position of the object; and
generate a target trajectory for the mobile object to travel along so as to pass through a point at which the risk is low,
wherein generating the target trajectory includes:
setting a plurality of first observation points at intervals in a traveling direction of the mobile object;
setting one or more second observation points in each of a left direction and a right direction as seen from the mobile object for each of the plurality of first observation points; and
searching for a point at which the risk is low on the basis of the risk at an observation point group including a first observation point and a second observation point corresponding to each other, and
wherein the processor executes the instructions to:
calculate a difference in the risk between observation points adjacent to each other in the left and right directions as seen from the mobile object among first observation points and second observation points included in the observation point group;
calculate a risk grade by calculating a weighted sum of the difference in the risk; and
correct a passing point of the target trajectory in a direction in which the risk decreases on the basis of the risk grade.

2. The mobile object control device according to claim 1, wherein the processor calculates the risk grade by calculating a weighted sum in which symmetrical weights are applied to the difference in the risk.

3. The mobile object control device according to claim 1, wherein the processor generates the target trajectory by first setting a base path, setting the plurality of first observation points on the base path at intervals, and correcting the base path in a direction in which the risk decreases on the basis of the risk grade, in one control cycle.

4. A mobile object control method executed using a mobile object control device, the method comprising:
recognizing an object which is located near a mobile object;
setting a risk which is an index value indicating a degree to which the mobile object should avoid entry on the basis of a position of the object; and
generating a target trajectory for the mobile object to travel along so as to pass through a point at which the risk is low,
wherein generating the target trajectory includes:
setting a plurality of first observation points at intervals in a traveling direction of the mobile object;
setting one or more second observation points in each of a left direction and a right direction as seen from the mobile object for each of the plurality of first observation points; and
searching for a point at which the risk is low on the basis of the risk at an observation point group including a first observation point and a second observation point corresponding to each other, and wherein the method comprises:

calculating a difference in the risk between observation points adjacent to each other in the left and right directions as seen from the mobile object among first observation points and second observation points included in the observation point group;

calculating a risk grade by calculating a weighted sum of the difference in the risk; and correcting a passing point of the target trajectory in a direction in which the risk decreases on the basis of the risk grade.

5. A computer-readable non-transitory storage medium having a program stored therein, the program causing a processor of a mobile object control device to execute:

recognizing an object which is located near a mobile object;

setting a risk which is an index value indicating a degree to which the mobile object should avoid entry on the basis of a position of the object; and generating a target trajectory for the mobile object to travel along so as to pass through a point at which the risk is low, wherein generating the target trajectory includes:

setting a plurality of first observation points at intervals in a traveling direction of the mobile object;

setting one or more second observation points in each of a left direction and a right direction as seen from the mobile object for each of the plurality of first observation points; and searching for a point at which the risk is low on the basis of the risk at an observation point group including a first observation point and a second observation point corresponding to each other, and wherein the program causes the processor to:

calculate a difference in the risk between observation points adjacent to each other in the left and right directions as seen from the mobile object among first observation point and second observation points included in the observation point group;

calculate a risk grade by calculating a weighted sum of the difference in the risk; and correct a passing point of the target trajectory in a direction in which the risk decreases on the basis of the risk grade.

* * * * *